United States Patent
Zhou et al.

(10) Patent No.: US 12,159,305 B2
(45) Date of Patent: Dec. 3, 2024

(54) CONTENT-RECOMMENDATION METHOD AND APPARATUS, ELECTRONIC DEVICE, AND SYSTEM

(71) Applicant: ADVANCED NEW TECHNOLOGIES CO., LTD., Grand Cayman (KY)

(72) Inventors: Zhichao Zhou, Hangzhou (CN); Jun Xiong, Hangzhou (CN); Feng Zhou, Hangzhou (CN); Jian Jiang, Hangzhou (CN); Guojin Huang, Hangzhou (CN); Yan Zheng, Hangzhou (CN); Jian Feng, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 16/959,643

(22) PCT Filed: Jan. 23, 2019

(86) PCT No.: PCT/CN2019/072761
§ 371 (c)(1),
(2) Date: Jul. 1, 2020

(87) PCT Pub. No.: WO2019/169963
PCT Pub. Date: Sep. 12, 2019

(65) Prior Publication Data
US 2021/0082026 A1    Mar. 18, 2021

(30) Foreign Application Priority Data
Mar. 7, 2018 (CN) .......................... 201810185112.7

(51) Int. Cl.
*G06Q 30/00* (2023.01)
*G06F 16/22* (2019.01)
*G06Q 30/0601* (2023.01)

(52) U.S. Cl.
CPC ......... *G06Q 30/0631* (2013.01); *G06F 16/22* (2019.01)

(58) Field of Classification Search
CPC ..... G06Q 30/0601–0645; G06Q 30/08; G06Q 30/0625–0631; G06Q 30/0276–0277;
(Continued)

(56) References Cited

U.S. PATENT DOCUMENTS

| | | |
|---|---|---|
| 4,281,391 A | 7/1981 | Huang |
| 6,526,166 B1 | 2/2003 | Gorman |

(Continued)

FOREIGN PATENT DOCUMENTS

| | | |
|---|---|---|
| CN | 101383032 | 3/2009 |
| CN | 201498035 | 6/2010 |

(Continued)

OTHER PUBLICATIONS

Sen, Shilad Wieland. "Nurturing Tagging Communities." Order No. 3349798 University of Minnesota, 2009. Ann Arbor: ProQuest. Web. Dec. 15, 2021. (Year: 2009).*

(Continued)

*Primary Examiner* — Michael Misiaszek
*Assistant Examiner* — Kennedy Gibson-Wynn
(74) *Attorney, Agent, or Firm* — Seed IP Law Group LLP

(57) ABSTRACT

The disclosed embodiments relate to a content-recommendation method and apparatus, an electronic device, and a system. The method comprises: searching, by a recommendation system according to a determined tag, a content database for content matching the tag; and recommending, by the recommendation system, the matching content to a (Continued)

user corresponding to the tag. Content in the content database is determined according to first-type content acquired by an internal-operation system by means of matching and second-type content acquired by an external-operation system by means of matching.

16 Claims, 7 Drawing Sheets

(58) Field of Classification Search
CPC .. G06Q 30/0246; G06Q 30/0251–0255; G06F 16/22
See application file for complete search history.

(56) References Cited

U.S. PATENT DOCUMENTS

| | | | |
|---|---|---|---|
| 6,601,035 | B1 | 7/2003 | Panagos |
| 6,697,947 | B1 | 2/2004 | Matyas, Jr. |
| 6,725,448 | B1 | 4/2004 | Moriya |
| 6,726,094 | B1 | 4/2004 | Rantze |
| 7,103,577 | B2 | 9/2006 | Blair |
| 7,130,817 | B2 | 10/2006 | Karas |
| 7,149,720 | B2 | 12/2006 | Shepherd |
| 7,321,874 | B2 | 1/2008 | Dilip |
| 7,447,663 | B1 | 11/2008 | Barker |
| 7,617,157 | B2 | 11/2009 | Seifert |
| 7,636,679 | B2 | 12/2009 | Song |
| 7,734,527 | B2 | 6/2010 | Uzo |
| 7,809,636 | B1 | 10/2010 | Jou |
| 7,809,762 | B1 | 10/2010 | Parker |
| 7,877,297 | B2 | 1/2011 | Gould |
| 7,941,760 | B2 | 5/2011 | Kocienda |
| 7,946,474 | B1 | 5/2011 | Agrawal |
| 7,978,900 | B2 | 7/2011 | Nepomniachtchi |
| 8,090,642 | B1 | 1/2012 | Van Doren |
| 8,176,324 | B1 | 5/2012 | Krishnamurthy |
| 8,280,782 | B1 | 10/2012 | Talreja |
| 8,423,392 | B2 | 4/2013 | Moxley |
| 8,423,467 | B1 | 4/2013 | Johansson |
| 8,498,933 | B1 | 7/2013 | Bent |
| 8,645,295 | B1 | 2/2014 | Dillard |
| 9,111,073 | B1 | 8/2015 | Jiang |
| 9,239,722 | B1 | 1/2016 | Calahan |
| 9,317,850 | B2 | 4/2016 | Keresman, III |
| 9,621,348 | B2 | 4/2017 | Bahjat |
| 9,715,681 | B2 | 7/2017 | Hammad |
| 10,176,478 | B2 | 1/2019 | Griggs |
| 10,270,730 | B1* | 4/2019 | Vippagunta ............. H04L 51/32 |
| 10,586,227 | B2 | 3/2020 | Makhdumi |
| 11,100,554 | B1* | 8/2021 | Gupta ................ G06Q 30/0641 |
| 2002/0111916 | A1 | 8/2002 | Coronna |
| 2002/0156687 | A1 | 10/2002 | Carr |
| 2002/0161466 | A1 | 10/2002 | Heching |
| 2003/0042301 | A1 | 3/2003 | Rajasekaran |
| 2003/0061172 | A1 | 3/2003 | Robinson |
| 2003/0200190 | A1 | 10/2003 | Adar |
| 2004/0139008 | A1 | 7/2004 | Mascavage |
| 2004/0153407 | A1 | 8/2004 | Clubb |
| 2005/0038707 | A1 | 2/2005 | Roever |
| 2005/0071637 | A1 | 3/2005 | Shirakawa |
| 2005/0075954 | A1 | 4/2005 | Matsumoto |
| 2005/0113123 | A1 | 5/2005 | Torvinen |
| 2005/0144406 | A1 | 6/2005 | Chong, Jr. |
| 2005/0170856 | A1 | 8/2005 | Keyani |
| 2005/0240935 | A1 | 10/2005 | Ramanathan |
| 2006/0010190 | A1 | 1/2006 | Shimbo |
| 2006/0056626 | A1 | 3/2006 | Keohane |
| 2006/0069635 | A1 | 3/2006 | Ram |
| 2006/0089897 | A1 | 4/2006 | Maas |
| 2006/0176847 | A1 | 8/2006 | Chen |
| 2006/0220842 | A1 | 10/2006 | Breed |
| 2006/0271783 | A1 | 11/2006 | Wong |
| 2007/0035617 | A1 | 2/2007 | Ko |
| 2007/0043651 | A1 | 2/2007 | Xiao |
| 2007/0276730 | A1 | 11/2007 | Lee |
| 2008/0004981 | A1 | 1/2008 | Gopalpur |
| 2008/0077542 | A1 | 3/2008 | McElhiney |
| 2008/0097805 | A1 | 4/2008 | Wells |
| 2008/0119160 | A1 | 5/2008 | Andriantsiferana |
| 2008/0120160 | A1 | 5/2008 | Woo |
| 2008/0182586 | A1 | 7/2008 | Aaron |
| 2008/0228595 | A1 | 9/2008 | Hill |
| 2008/0235122 | A1 | 9/2008 | Weitzman |
| 2008/0306839 | A1 | 12/2008 | Starrs |
| 2009/0076926 | A1 | 3/2009 | Zinberg |
| 2009/0090772 | A1 | 4/2009 | Lee |
| 2009/0094275 | A1 | 4/2009 | Patton |
| 2009/0106825 | A1 | 4/2009 | Cerruti |
| 2009/0144451 | A1 | 6/2009 | Cabezas |
| 2009/0157522 | A1 | 6/2009 | Srinivasan |
| 2009/0195506 | A1 | 8/2009 | Geidl |
| 2010/0042600 | A1 | 2/2010 | Orr |
| 2010/0060585 | A1 | 3/2010 | Chiu |
| 2010/0073302 | A1 | 3/2010 | Ritzau |
| 2010/0088026 | A1 | 4/2010 | Manolescu |
| 2010/0162036 | A1 | 6/2010 | Linden |
| 2010/0191648 | A1 | 7/2010 | Smith |
| 2010/0210240 | A1 | 8/2010 | Mahaffey |
| 2010/0223543 | A1 | 9/2010 | Marston |
| 2010/0235283 | A1 | 9/2010 | Gerson |
| 2010/0241575 | A1 | 9/2010 | Cotton |
| 2010/0250436 | A1 | 9/2010 | Loevenguth |
| 2011/0016520 | A1 | 1/2011 | Cohen |
| 2011/0093493 | A1 | 4/2011 | Nair |
| 2011/0125616 | A1 | 5/2011 | Ni |
| 2011/0125667 | A1 | 5/2011 | Faludi |
| 2011/0184840 | A1 | 7/2011 | Godard |
| 2011/0231465 | A1 | 9/2011 | Phatak |
| 2011/0258027 | A1 | 10/2011 | Lee |
| 2011/0264598 | A1 | 10/2011 | Fuxman |
| 2012/0016799 | A1 | 1/2012 | Killian |
| 2012/0076283 | A1 | 3/2012 | Ajmera |
| 2012/0101942 | A1 | 4/2012 | Park |
| 2012/0117271 | A1 | 5/2012 | Kennedy |
| 2012/0143924 | A1 | 6/2012 | Sethi |
| 2012/0158467 | A1 | 6/2012 | Hammad |
| 2012/0198228 | A1 | 8/2012 | Oberheide |
| 2012/0204256 | A1 | 8/2012 | Craine |
| 2012/0233073 | A1 | 9/2012 | Salmon |
| 2012/0259774 | A1 | 10/2012 | Marti |
| 2012/0259783 | A1 | 10/2012 | Kemper |
| 2012/0284776 | A1 | 11/2012 | Sundaram |
| 2012/0299831 | A1 | 11/2012 | Lioy |
| 2012/0323846 | A1 | 12/2012 | Bai |
| 2013/0066889 | A1 | 3/2013 | Rodriguez |
| 2013/0067055 | A1 | 3/2013 | Cheng |
| 2013/0094751 | A1 | 4/2013 | Nepomniachtchi |
| 2013/0110670 | A1 | 5/2013 | Webber |
| 2013/0232071 | A1 | 9/2013 | Dilip |
| 2013/0246172 | A1 | 9/2013 | Moissinac |
| 2013/0311532 | A1 | 11/2013 | Olsen |
| 2013/0317895 | A1 | 11/2013 | Turner |
| 2013/0331130 | A1 | 12/2013 | Lee |
| 2014/0037184 | A1 | 2/2014 | Gorski |
| 2014/0052636 | A1 | 2/2014 | Mattes |
| 2014/0156512 | A1 | 6/2014 | Rahman |
| 2014/0162698 | A1 | 6/2014 | Han |
| 2014/0164109 | A1 | 6/2014 | Chow |
| 2014/0173755 | A1 | 6/2014 | Wahl |
| 2014/0236801 | A1 | 8/2014 | Hansen |
| 2014/0279525 | A1 | 9/2014 | Mohsenzadeh |
| 2014/0280910 | A1 | 9/2014 | Swig |
| 2014/0306896 | A1 | 10/2014 | Sosby |
| 2014/0310133 | A1 | 10/2014 | Bednar |
| 2014/0310171 | A1 | 10/2014 | Grossman |
| 2015/0066679 | A1 | 3/2015 | Mack |
| 2015/0154587 | A1 | 6/2015 | Chetty |
| 2015/0186989 | A1 | 7/2015 | Kneen |
| 2015/0220876 | A1 | 8/2015 | Sethi |
| 2015/0235477 | A1 | 8/2015 | Simkin |
| 2015/0356288 | A1 | 12/2015 | Guo |
| 2015/0379460 | A1 | 12/2015 | Zamer |
| 2015/0381629 | A1 | 12/2015 | O'Sullivan |

(56) References Cited

U.S. PATENT DOCUMENTS

| | | | |
|---|---|---|---|
| 2016/0004857 A1 | 1/2016 | Chen | |
| 2016/0012503 A1 | 1/2016 | Fu | |
| 2016/0077734 A1 | 3/2016 | Buxton | |
| 2016/0140519 A1* | 5/2016 | Trepca | G06F 16/245 705/26.44 |
| 2016/0182515 A1* | 6/2016 | Barraclough | H04L 63/0892 |
| 2017/0270598 A1 | 9/2017 | Ram | |
| 2019/0087435 A1* | 3/2019 | Katardjiev | G06F 16/23 |
| 2019/0130453 A1* | 5/2019 | Sasapu | G06Q 30/0631 |

FOREIGN PATENT DOCUMENTS

| | | |
|---|---|---|
| DE | 102004047258 | 4/2006 |
| EP | 0992949 | 4/2000 |
| EP | 1067471 | 1/2001 |
| GB | 2378787 | 2/2003 |
| JP | 10240690 | 9/1998 |
| JP | 2000082101 | 3/2000 |
| JP | 2001297283 | 10/2001 |
| JP | 2003271851 | 9/2003 |
| JP | 2006259854 | 9/2006 |
| JP | 2007087081 | 4/2007 |
| JP | 2008532112 | 8/2008 |
| JP | 2009020676 | 1/2009 |
| JP | 2010066886 | 3/2010 |
| JP | 2012168616 | 9/2012 |
| JP | 2013235605 | 11/2013 |
| JP | 201441614 | 6/2014 |
| JP | 2014515149 | 6/2014 |
| KR | 20020057906 | 7/2002 |
| KR | 1020020057906 | 7/2002 |
| KR | 1020070034296 | 3/2007 |
| WO | 2012045128 | 4/2012 |
| WO | 2013003372 | 1/2013 |
| WO | 2013149883 | 10/2013 |
| WO | 2017080768 | 5/2017 |

OTHER PUBLICATIONS

Otebolaku, Abayomi Moradeyo. "Context-Aware Personalization for Mobile Multimedia." Order No. 10596368 Universidade do Porto (Portugal), 2015. Ann Arbor: ProQuest. Web. Jul. 6, 2022. (Year: 2015).*

Xiao, Ying. "Recommending Best Products from E-Commerce Purchase History and User Click Behavior Data." Order No. 10811015 University of Windsor (Canada), 2018. Ann Arbor: ProQuest. Web. Feb. 7, 2023. (Year: 2018).*

Barnes, David, Matthew Hinton, and Suzanne Mieczkowska. "Developing a framework to investigate the impact of e-commerce on the management of internal business processes." Knowledge and Process Management 9.3 (2002): 133-142. (Year: 2002).*

Schafer, J. Ben, Joseph A. Konstan, and John Riedl. "E-commerce recommendation applications." Data mining and knowledge discovery 5 (2001): 115-153. (Year: 2001).*

Zhou, Meizi, et al. "Micro behaviors: A new perspective in e-commerce recommender systems." Proceedings of the eleventh ACM international conference on web search and data mining. 2018. (Year: 2018).*

Finzgar, Use of NFC and QR code identification in an electronic ticket system for public transpot, Sep. 15-17, 2011, IEEE, Nov. 1, 2011 (Year: 2011).

Kanitkar et al. "Real-time processing in client-server databases", 2002, IEEE Transactions on Computers (vol. 51, Issue: 3, Mar. 2002), pp. 1-4 of 2.1 (Year: 2002).

* cited by examiner

CONTENT-RECOMMENDATION METHOD AND APPARATUS, ELECTRONIC DEVICE, AND SYSTEM

CROSS-REFERENCE TO RELATED APPLICATIONS

The present patent application claims priority to Chinese Patent Application No. 201810185112.7, filed on Mar. 7, 2018 and entitled "CONTENT-RECOMMENDATION METHOD AND APPARATUS, ELECTRONIC DEVICE, AND SYSTEM," which is incorporated herein by reference in its entirety.

FIELD

The disclosed embodiments relate to the field of networking technologies, and in particular to a content-recommendation method and apparatus, an electronic device, and a system.

BACKGROUND

With the rapid development of e-commerce, content recommendation of important information (such as merchandise information, coupon information, discount information, etc.) in e-commerce has becomes key to operations.

Currently, during the operation and maintenance of e-commerce, recommendation is mainly executed by an operation platform. The operation platform not only autonomously configures internal operation configurations, but also receives external operation configurations determined by merchants. The operation platform integrates the internal operation configurations and the external operation configurations to form operation-configuration information, and sends the operation-configuration information to an internal-operation system for content matching. The internal-operation system sends matched content to a recommendation system. During user access, the recommendation system acquires appropriate content from the recommendation system by means of matching according to a tag determined based on information like the user's account and the like, and recommends the content to the user.

Therefore, the external operation configurations are decided by the merchant and need to be processed by the operation platform, while content matching is performed by the internal-operation system, thus limiting the external operations of the merchants.

SUMMARY

The disclosed embodiments provide a content-recommendation method and apparatus, an electronic device, and a system, for solving the problem of the current technologies that limiting external operations of merchants.

In order to solve the aforementioned technical problem, the disclosed embodiments use the following technical solutions:

A first aspect provide a content-recommendation method, comprising:

searching, by a recommendation system according to a determined tag, a content database for content matching the tag; and recommending, by the recommendation system, the matched content to a user corresponding to the tag;

wherein content in the content database is determined according to first-type content acquired by an internal-operation system by means of matching and second-type content acquired by an external-operation system by means of matching.

A second aspect provides a content-recommendation apparatus, comprising:

a search module configured to search, according to a determined tag, a content database for content matching the tag; and a recommendation module configured to recommend the matched content to a user corresponding to the tag;

wherein, content in the content database is determined according to first-type content acquired by an internal-operation system by means of matching and second-type content acquired by an external-operation system by means of matching.

A third aspect provides a content-recommendation apparatus, comprising:

a matching module configured to acquire second-type content by means of matching according to external operation-configuration information uploaded by a merchant; and a sending module configured to send to a recommendation system;

wherein the second-type content is used for determining, together with first-type content acquired by an internal-operation system by means of matching, content in a content database of the recommendation system.

A fourth aspect provide a content-recommendation system, comprising:

a recommendation system configured to search, according to a determined tag, a content database for content matching the tag and recommending the matched content to a user corresponding to the tag;

an internal-operation system configured to acquire first-type content by means of matching; and an external-operation system, configured to acquire second-type content by means of matching;

wherein content in the content database is determined according to the first-type content acquired by the internal-operation system by means of matching and the second-type content acquired by the external-operation system by means of matching.

A fifth aspect provide an electronic device is provided, comprising: a memory, a processor, and a computer program stored in the memory and executable on the processor, wherein the computer program is executed by the processor to:

search, according to a determined tag, a content database for content matching the tag; and recommend the matched content to a user corresponding to the tag;

wherein the content in the content database is determined according to first-type content acquired by an internal-operation system by means of matching and second-type content acquired by an external-operation system by means of matching.

A sixth aspect provide an electronic device, comprising: a memory, a processor, and a computer program stored in the memory and executable on the processor, wherein the computer program is executed by the processor to:

acquire second-type content by means of matching according to external operation-configuration information uploaded by a merchant; and send the second-type content to a recommendation system;

wherein the second-type content is used for determining, together with first-type content acquired by an internal-operation system by means of matching, content in a content database of the recommendation system.

A seventh aspect provide a computer-readable storage medium, wherein the computer-readable storage medium stores one or more programs, and when the one or more programs are executed by a server comprising a plurality of applications, the server is caused to execute the following operations:

search, according to a determined tag, a content database for content matching the tag; and recommend the matched content to a user corresponding to the tag;

wherein the content in the content database is determined according to first-type content acquired by an internal-operation system by means of matching and second-type content acquired by an external-operation system by means of matching.

An eighth aspect provide a computer-readable storage medium, wherein the computer-readable storage medium stores one or more programs, and when the one or more programs are executed by a server comprising a plurality of applications, the server is caused to execute the following operations:

acquire second-type content by means of matching according to external operation-configuration information uploaded by a merchant; and send the second-type content to a recommendation system;

wherein the second-type content is used for determining, together with first-type content acquired by an internal-operation system by means of matching, content in a content database of the recommendation system.

The aforementioned at least one technical solution provided by the disclosed embodiments can achieve the following beneficial effects:

Using the aforementioned technical solutions, the recommendation system searches the content database for content matching a determined tag, and recommends the content to a corresponding user. In addition, the content is determined according to the first-type content acquired by the internal-operation system by means of matching and the second-type content acquired by the external-operation system by means of matching. Therefore, the external-operation system and the internal-operation system can both be configured in the content-recommendation system, thereby ensuring parallel processing of external operations and internal operations. This competition mechanism is capable of improving a conversion rate. In addition, the external-operation system and the internal-operation system can share the recommendation system, thereby ensuring the completeness of content in the recommendation system and the association of the content with external and internal operations. Therefore, the overall operation and maintenance efficiency of the content-recommendation system and an overall resource utilization rate are improved.

BRIEF DESCRIPTION OF THE FIGURES

To describe the technical solutions of the disclosed embodiments more clearly, the following descriptions briefly introduces the accompanying drawings for describing the embodiments. It is apparent that the accompanying drawings described below are only a part of the disclosed embodiments, and those of ordinary skill in the art may be able to derive other drawings from these accompanying drawings without creative efforts.

DETAILED DESCRIPTION

To make the objectives, technical solutions, and advantages of the disclosed embodiments, the following clearly and completely describes the technical solutions of the disclosed embodiments with reference to specific embodiments and corresponding accompanying drawings. It is apparent that the described embodiments are merely a part of rather than all of the embodiments of the application. All other embodiments acquired by those of ordinary skill in the art on the basis of the disclosed embodiments without creative efforts shall fall within the protection scope of the embodiments of the application.

The technical solutions provided by the disclosed embodiments are described below in detail with reference to the accompanying drawings.

Embodiment 1

Figure 1:
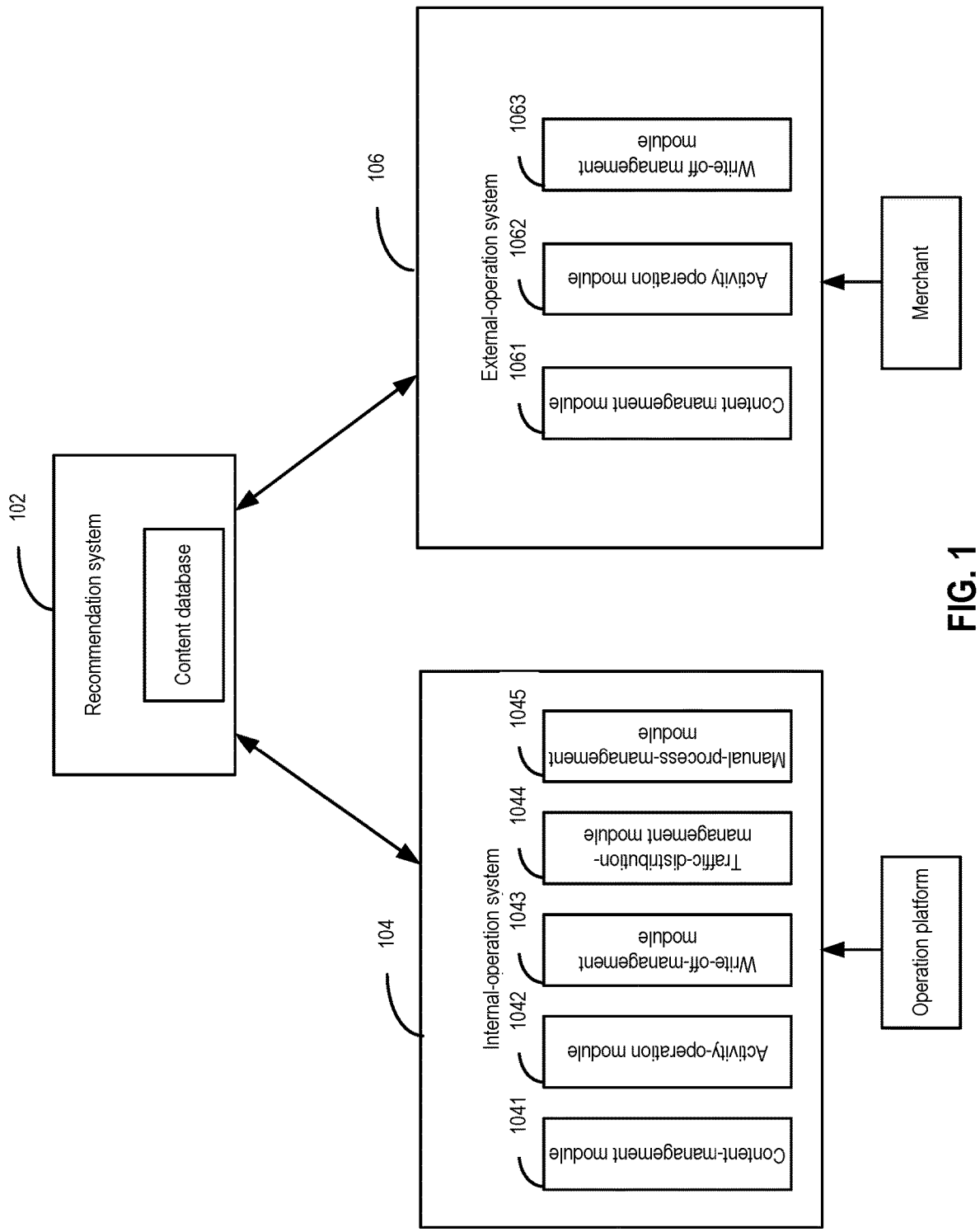
FIG. 1 is a schematic diagram of a system architecture of a content-recommendation solution, provided by one embodiment.

First, a system architecture, to which a content-recommendation solution in the disclosed embodiments is applicable, is described. As shown in FIG. 1, the content-recommendation solution is applicable to: a system architecture consisting of an operation platform and a merchant. The system architecture mainly includes a recommendation system 102, an internal-operation system 104, and an external-operation system 106. External-operation system 106 and internal-operation system 104 can perform, in parallel, operation content matching and content uploading to recommendation system 102. This way, although external operations and internal operations are mutually independent in operation management, they can share recommendation system 102.

Recommendation system 102 may be a server on the side of an operation platform, and is configured to achieving aggregation of to-be-recommended content and recommendation searching. In addition, recommendation system 102 has at least one built-in content database configured to store content received by the recommendation system 102.

Internal-operation system 104 is also a server on the side of the operation platform, and is configured to acquire first-type content by means of matching according to operation-configuration information configured by administrators of the operation platform. Internal-operation system 104 may specifically include a content-management module 1041, an activity-operation module 1042, a write-off-management module 1043, a traffic-distribution-management module 1044, and a manual-process-management module 1045. In addition, internal-operation system 104 may further include other modules that assist in executing management of the operation platform. Specifically:

Content management module 1041 is mainly used to manage content related to merchandises that may be promoted by merchants, such as merchandise details, merchandise specifications, model displays, etc. Meanwhile, content management module 1041 can also be used to manage categories of merchandise, such as clothing, shoes, bags, undergarment accessories, etc. The internal-operation system may acquire, from content management module 1041 by means of matching according to the received operation-configuration information, to-be-recommended content.

Activity operation module 1042 is mainly used to manage special offers that the operation platform may provide, such as vouchers, discount coupons, consumption coupons, or other loyalty programs.

Write-off-management module 1043 is mainly used to manage write-off of the special offers provided by activity operation module 1042.

Traffic distribution management module 1044 is mainly used to manage distribution of traffic of content; for example, if access amount to clothing content is relatively large, then more traffic will be distributed to the clothing content.

Manual-process-management module 1045 is mainly used to manage recommendations of the first-type content acquired by the internal-operation system by means of matching and the second-type content acquired by the external-operation system by means of matching; for example, manual-process-management module 1045 manages recommendation policies for content of various types.

External-operation system 106 may be a server on the side of merchants, and is used to acquire second-type content by means of matching according to operation-configuration information configured by one or more merchants. External-operation system 106 may specifically include a content-management module 1061, an activity-operation module 1062, and a write-off-management module 1063. In addition, external-operation system 106 may further include other modules for assisting the merchants and the operation platform in executing management.

It should be noted that the function of each of content-management module 1061, activity-operation module 1062, and write-off-management module 1063 included in external-operation system 106 may be similar to the substantive function of a corresponding module included in internal-operation system 104. For example, both content management module 1041 and content management module 1061 are used to manage merchandise content, such as merchandise details of a merchandise A, specifications of a merchandise B, and other similar content related to merchandises.

It should be understood that in the disclosed embodiments, external-operation system can be configured to include one or more data interfaces used to receive external configuration information uploaded by the external merchants. These data interfaces can be distinguished from each other according to merchant identifiers, or not need to be distinguished from each other, which is not limited by the disclosure.

Embodiment 2

A content-recommendation solution is described below in detail using embodiment 2.

Figure 2:
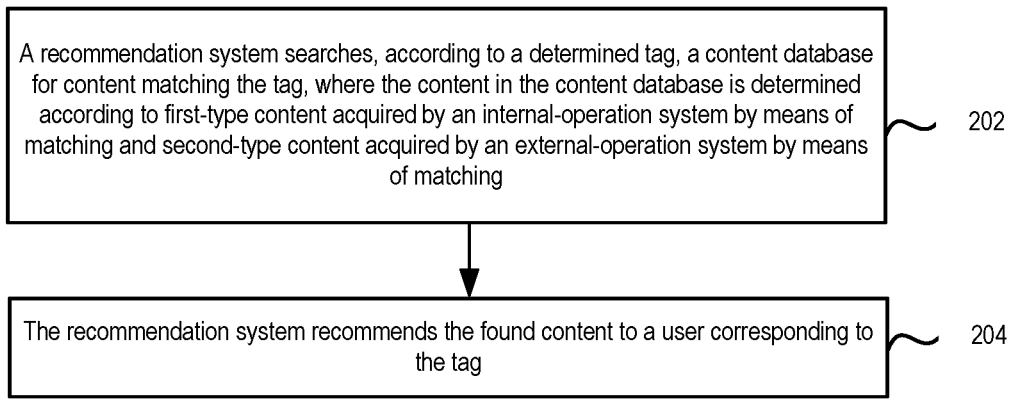
FIG. 2 is a first flowchart of operations of a content-recommendation method, provided by one embodiment.

FIG. 2 is a first flowchart of operations of a content-recommendation method, provided by one embodiment. An execution entity of the content-recommendation method includes at least a recommendation system. The method mainly includes:

Operation 202: a recommendation system searches, according to a determined tag, a content database for content matching the tag.

Content in the above content database is determined according to first-type content acquired by an internal-operation system by means of matching and second-type content acquired by an external-operation system by means of matching.

In one embodiment, the above determined tag is determined by analyzing a user identifier when the user logs in to or accesses a website operated by the operation platform. The user identifier may include a user account, a mobile phone number, etc. The specific format of the user identifier may be a string consisting of numbers, letters, underscores, etc. combined in any manner. The number of determined tags may be one or multiple, which is not limited by the disclosed embodiments. The tag may specifically be a keyword related to merchandise recommendation, such as the gender, identity, occupation, location, etc. of the user. For example, a tag may be one of or a combination of: female, student, and Hong Kong.

The content database can store one or more correspondence relationships. Each of the one or more correspondences relationships is a correspondence between content and a tag. Specifically, one piece of content may correspond to one tag; or, one piece of content may correspond to a plurality of tags; or, a plurality of pieces of content may correspond to one tag; or, a plurality of pieces of content may correspond to a plurality of tags.

It should be understood that in the disclosed embodiments, content in the content database is not acquired only by the internal-operation system by means of matching, but is collectively determined based on the first-type content acquired by the internal-operation system by means of matching and the second-type content acquired by the external-operation system by means of matching. Therefore, the content in the content database is not only associated with the internal-operation system, but also associated with the external-operation system. The content in the content database can be merchandise information, coupon information, discount activity information, etc.

Operation 204: the recommendation system recommends the found content to a user corresponding to the tag.

In the disclosed embodiments, after the recommendation system finds the content matching the tag, the recommendation system recommends the content to a user corresponding to the tag, thus achieving promotion of content of merchandise or information related to the merchandise.

In the aforementioned technical solutions, the recommendation system searches the content database for content matching a determined tag, and recommends the content to the corresponding user. In addition, the content is determined according to the first-type content acquired by the internal-operation system by means of matching and the second-type content acquired by the external-operation system by means of matching. Therefore, the external-operation system and the internal-operation system can both be configured in the content-recommendation system, thereby ensuring parallel processing of the external and internal operations. This competition mechanism is capable of improving a conversion rate. In addition, the external-operation system and the internal-operation system can share the recommendation system, thereby ensuring the completeness of content in the recommendation system and the association of the content with external operations and internal operations. Therefore, the overall operation and maintenance efficiency of the content-recommendation system and an overall resource utilization rate are improved.

Figure 3A:
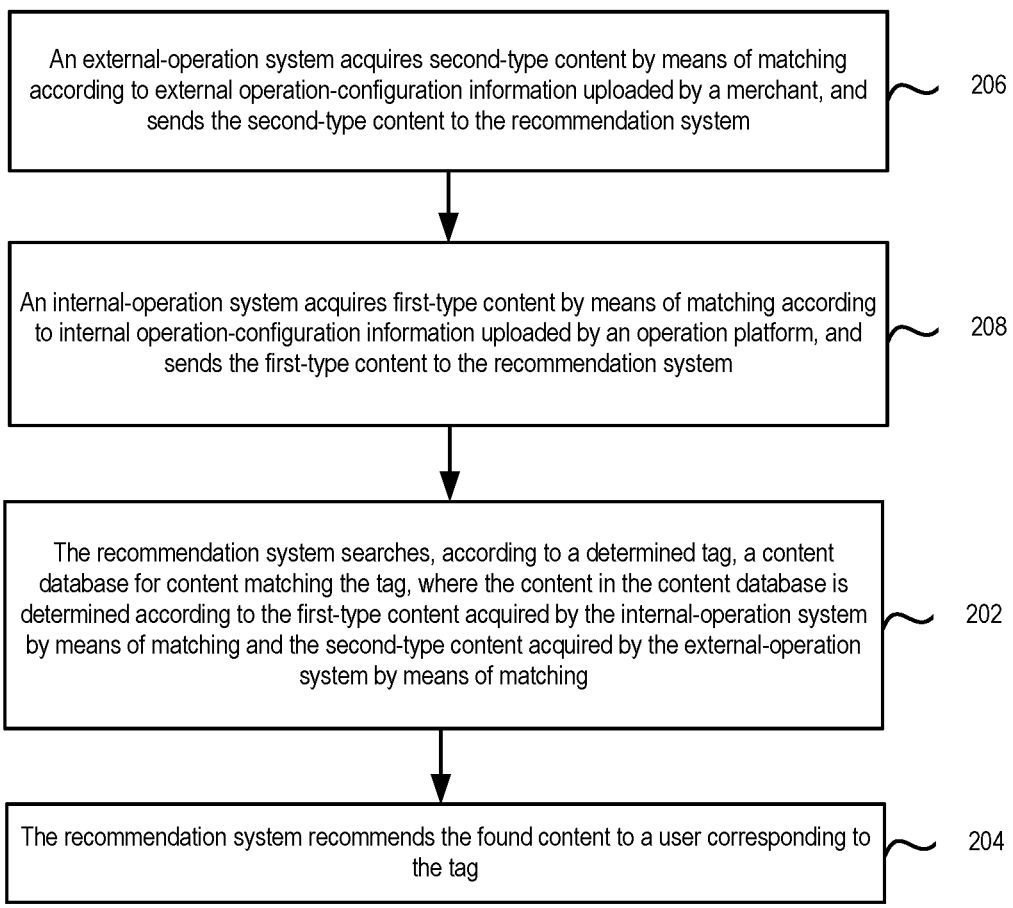
FIG. 3a is a second flowchart of operations of a content-recommendation method, provided by one embodiment.

It should be understood that the content database in the recommendation system may be pre-configured. As shown in FIG. 3a, specifically, the following operations can be performed before operation 202:

Operation 206: external-operation system acquires the second-type content by means of matching according to external operation-configuration information uploaded by a merchant, and sends the second-type content to the recommendation system.

The external-operation system is a newly added system, and a corresponding service interface is developed to facilitate usages of the external-operation system by merchants. In a specific implementation, the external-operation system can be presented as a web page. A merchant analyzes historical data, such as user historical behaviors and transaction records, to determine external operation-configuration information conforming to an operation mode of the merchant. Specifically, manual analysis or automatic statistical analysis can be used, which is not limited by the disclosure.

It should be understood that the external operation-configuration information involved herein may be various tags, e.g., female, student, and weather, acquired by means of analysis on the historical data. These tags are related to merchandises. Alternatively, the external operation-configuration information may be a merchandise-operation scheme acquired by means of analysis based on the historical data, for example, targeting female college students having access needs on a rainy or cloudy day.

Then, the external-operation system acquires the second-type content by means of matching according to the external operation-configuration information uploaded by the merchant. In one implementable scheme, based on a tag uploaded by the merchant, corresponding merchandise content is acquired from a content-management module by means of matching and corresponding activity content is acquired from an activity operation module by means of matching. For example, if the tags are female, student, and weather, then cartoon patterns or other cute umbrellas, raincoats, and rain boots can be acquired from promotional content by means of matching. Further, special offers or coupons related to these tags or related to the matched merchandise content are acquired from promotional activities by means of matching. The above content serves as the second-type content and is recommended to the recommendation system. In another implementable scheme, according to an operation scheme uploaded by the merchant, corresponding merchandise content is acquired from the content-management module by means of matching and corresponding activity content is separately acquired from the activity operation module by means of matching. If the merchandise-operation scheme targets a female college student having access needs on a rainy or cloudy day, then keywords "female," "student," and "weather" can be extracted from the operation scheme, and corresponding merchandise content is acquired from the promotional content by means of matching according to the method for processing the tags. Further, related special offers or coupons are acquired from the promotional activities by means of matching. The above content serves as the second-type content and is recommended to the recommendation system.

Operation 208: the internal-operation system acquires the first-type content by means of matching according to internal operation-configuration information uploaded by the operation platform, and sends the first-type content to the recommendation system.

It should be understood that the internal-operation system may include all functions of the external-operation system. In addition, as an internal server of the operation platform, the internal-operation system also has some functions lacked by the external-operation system. For example, the internal-operation system may also acquire traffic-occupancy rates of various types of content by means of matching according to a traffic-distribution policy in operation-configuration information configured by administrators of the operation platform. Feedback is subsequently sent to the recommendation system for reasonable recommendation, thus facilitating reasonable provisioning of resources.

It should be noted that in the disclosed embodiments, the order between operation 206, in which the external-operation system uploads the second-type content, and operation 208, in which the internal-operation system uploads the first-type content, may not be limited. That is, these operations may be performed in the order shown in FIG. 3a; or, operation 208 may be performed first, then operation 206 is performed; or, operation 208 and operation 206 are performed simultaneously. The order of operation between step 206 and step 208 described herein does not affect the core solution of the disclosed embodiments, in which the external-operation system and the internal-operation system perform processing in parallel.

Figure 3B:
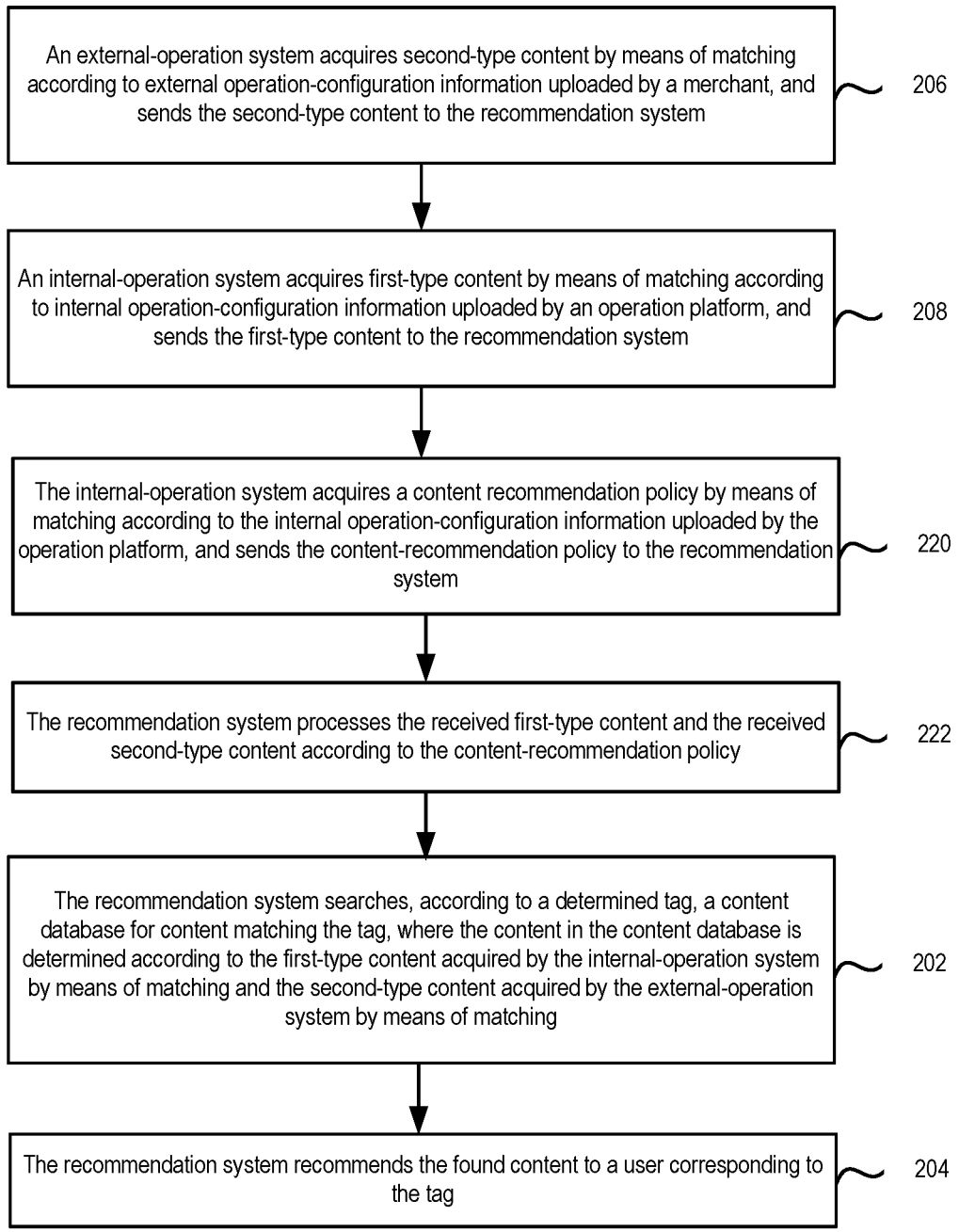
FIG. 3b is a third flowchart of operations of a content-recommendation method, provided by one embodiment.

In addition, in the disclosed embodiments, the internal-operation system can further include a manual-process-management module. Accordingly, as shown in FIG. 3b, prior to operation 202, the method further includes:

Operation 220: the internal-operation system acquires a content-recommendation policy by means of matching according to the internal operation-configuration information uploaded by the operation platform, and sends the content-recommendation policy to the recommendation system.

The internal-operation system may also acquire an internal recommendation policy by means of matching according to the internal operation configuration information, and send the internal recommendation policy to the recommendation system, so that the recommendation system decides a recommendation method or a recommendation order.

Operation 222: the recommendation system processes the received first-type content and the received second-type content according to the content-recommendation policy.

Here, operation 220 and operation 222 can be performed in parallel with operation 206 and operation 208, or the operations are performed in a sequential order, which is not limited by the disclosure.

It should be understood that the content-recommendation policy may include various recommendation policies configured by operation and maintenance staff or the operation platform administrators. The content-recommendation policy may specifically include a merging sub-policy, a sorting sub-policy, etc. Description is provided below using these two sub-policies as examples.

(1) The content-recommendation policy includes the merging sub-policy.

The merging sub-policy can be a specific manner of merging, such as a machine-predicted merging model or a manually configured merging model. The manually configured merging model may be a merging model acquired by associated staff of the operation platform by means of calculation according to the historical data.

In a specific implementation, operation 222 includes:

merging, by the recommendation system, the received first-type content with the received second-type content according to the merging sub-policy, and storing the merged content in the content database. Specifically, the recommendation system uses the received merging sub-policy as a basis. Assuming the merged sub-policy is based on weight ratios, the weight of the first-type content is 0.2, and the weight of the second-type content is 0.8, then the merged content is 0.2×the first-type content +0.8×the second-type content.

It should be noted that the aforementioned merging sub-policy being based on weight ratios is merely a simple example. An actual merging model can configure different complexity according to the amount of content and the number of merchants.

Optionally, in one embodiment, the content-recommendation policy further includes the sorting sub-policy. After the merging operation is completed in operation 222, the method may further include:

sorting, by the recommendation system according to the sorting sub-policy, the merged content stored in the content database.

(2) The content-recommendation policy includes the sorting sub-policy.

The sorting sub-policy can be a specific sorting manner, such as performing sorting according to the size of the content, performing sorting according to a degree of relevance between the content and the tag, performing sorting according to the aging of the content, etc. The embodiments of the disclosure do not limit the content of the sorting sub-policy.

In a specific implementation, operation 222 includes:

sorting, by the recommendation system, the received first-type content and the received second-type content according to the sorting sub-policy. Specifically, the recommendation system uses the received sorting sub-policy as a basis. Assuming that the sorting sub-policy is to perform sorting according to a degree of relevance between the content and the tag, then the recommendation system can sort all of the received first-type content and all of the received second-type content according to the degree of relevance between the content and the tag. The sorted first-type content and the sorted second-type content may be recommended to the user in this order. Alternatively, merging operation may be further performed, that is, the recommendation system also receives the merging sub-policy at the time of receiving the sorting sub-policy. After sorting is completed, the first-type content and the second-type content may be merged according to the merging sub-policy. Then, the merged content is recommended.

It should be understood that on the basis of the aforementioned solution, after the recommendation system uses the content-recommendation policy to process the received first-type content and the received second-type content, and accordingly, recommending, by the recommendation system, the found content to the user corresponding to the tag can be specifically implemented as:

sequentially recommending, by the recommendation system according to a sorting order, the found content to the user corresponding to the tag.

In the disclosed embodiments, through the configuration of the external-operation system, merchants can share the recommendation system directly using the external-operation system. Acquiring, by the external-operation system, the second-type content by means of matching according to the external operation-configuration information uploaded by the merchant can be specifically implemented in at least the following two manners.

Figure 4A:
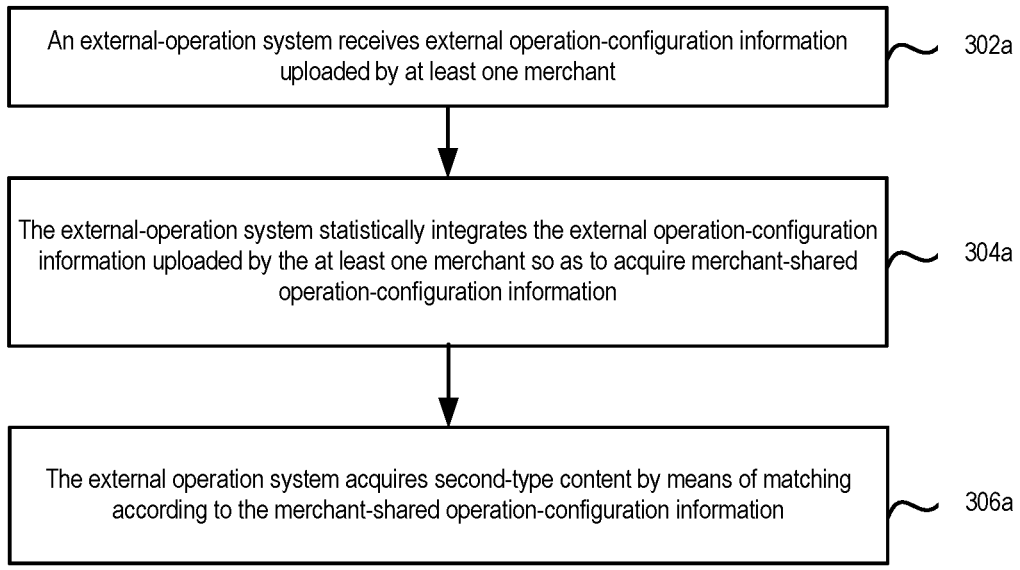
FIG. 4a is a first schematic diagram of specific execution of operation 222 of a content-recommendation method, provided by one embodiment.

As shown in FIG. 4*a*, acquiring, by the external-operation system, the second-type content by means of matching specifically includes the following operations:

Operation 302*a*: the external-operation system receives external operation-configuration information uploaded by at least one merchant.

Operation 304*a*: the external-operation system statistically integrates the external operation-configuration information uploaded by the at least one merchant, thus obtaining merchant-shared operation-configuration information.

An involved statistical integration method can be flexibly designed according to the operation conditions, which is not limited by the disclosure.

Operation 306*a*: the external-operation system acquires the second-type content by means of matching according to the merchant-shared operation-configuration information.

Figure 4B:
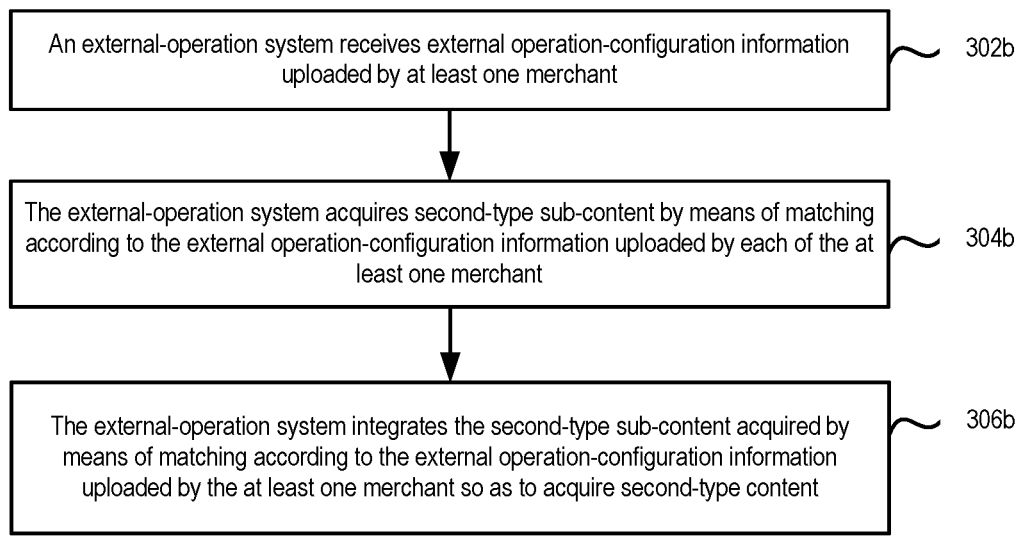
FIG. 4b is a second schematic diagram of specific execution of operation 222 of a content-recommendation method, provided by one embodiment.

As shown in FIG. 4*b*, acquiring, by the external-operation system, the second-type content by means of matching specifically includes the following operation:

Operation 302*b*: the external-operation system receives external operation-configuration information uploaded by at least one merchant.

Operation 304*b*: the external-operation system acquires second-type sub-content by means of matching according to the external operation-configuration information uploaded by each of the at least one merchant.

Operation 306*b*: the external-operation system integrates the second-type sub-content acquired by means of matching according to the external operation-configuration information uploaded by the at least one merchant, thus obtaining the second-type content.

Figure 5:
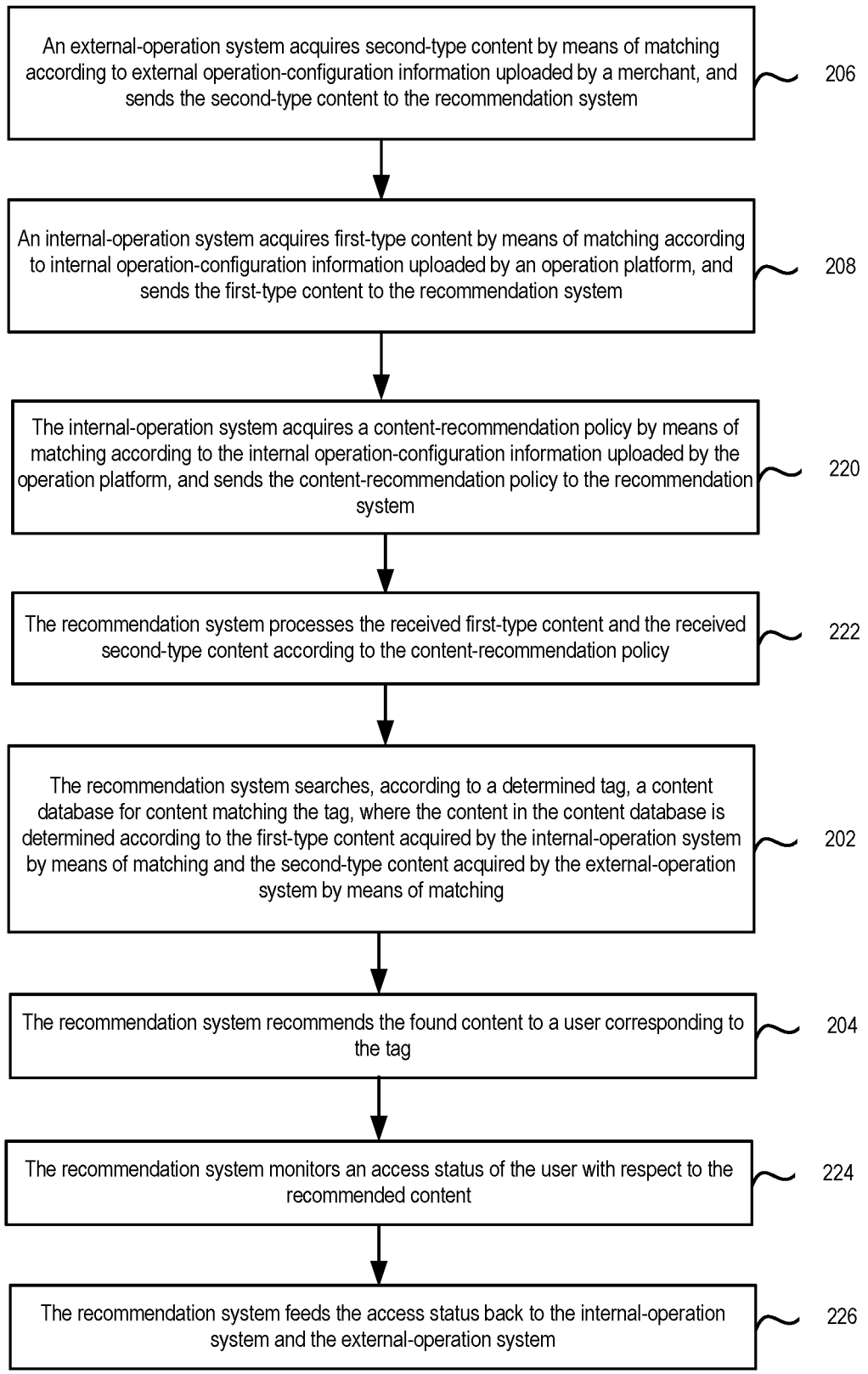
FIG. 5 is a fourth flowchart of operations of a content-recommendation method, provided by one embodiment.

It should be understood that as shown in FIG. 5, after recommending, by the recommendation system, the found content to a user corresponding to the tag, the method further includes:

Operation 224: the recommendation system monitors an access status of the user with respect to the recommended content.

The recommendation system can monitor the access status of the user with respect to the content recommended by the recommendation system, such as monitoring a browsing time, the count of browsing occurrences, whether a recommended merchandise is purchased, whether a recommended coupon is used, etc.

Operation 226: the recommendation system feeds the access status back to the internal-operation system and the external-operation system.

Accordingly, in order to enable the internal-operation system and the external-operation system to timely allocate resources, the recommendation system feeds the access status back to the internal-operation system and the external-operation system. This way, the internal-operation system can timely adjust the internal operation-configuration according to the access status to meet the user needs.

Similarly, the external-operation system can also timely adjust the external operation configuration in time according to the access status to meet the user needs. Therefore, content-recommendation efficiency is improved.

The recommendation system further feeds a usage status of the coupon and the like back to a write-off-management module, thus facilitating in updating the validity of the coupons or introducing new coupons.

It should be understood that in the disclosed embodiments, the content in the content database of the recommendation system may also be updated periodically. An update scheme is similar to the pre-configuration scheme, and details will not be described herein again.

Embodiment 3

According to FIG. 1, which is a schematic structural diagram of a content-recommendation system, provided by one embodiment, the apparatus mainly includes a recommendation system 102, an internal-operation system 104, and an external-operation system 106.

Recommendation system 102 searches, according to a determined tag, a content database for content matching the tag and recommends the found content to a user corresponding to the tag.

Internal-operation system 104 acquires first-type content by means of matching.

External-operation system acquires second-type content by means of matching.

The content in the content database is determined according to the first-type content acquired by the internal-operation system by means of matching and the second-type content acquired by the external-operation system by means of matching.

In the disclosed embodiments, the recommendation system searches the content database for content matching a determined tag and recommends the content to a corresponding user. In addition, the content is determined according to the first-type content acquired by the internal-operation system by means of matching and the second-type content acquired by the external-operation system by means of matching. Therefore, the external-operation system and the internal-operation system can both be configured in the content-recommendation system, thereby ensuring parallel processing of external operations and internal operations. This competition mechanism improves a conversion rate. In addition, the external-operation system and the internal-operation system can share the recommendation system, thereby ensuring the completeness of the content in the recommendation system as well as the association of the content with external operations and internal operations. Therefore, the overall operation and maintenance efficiency of the content-recommendation system and an overall resource utilization rate are improved.

Figure 6:
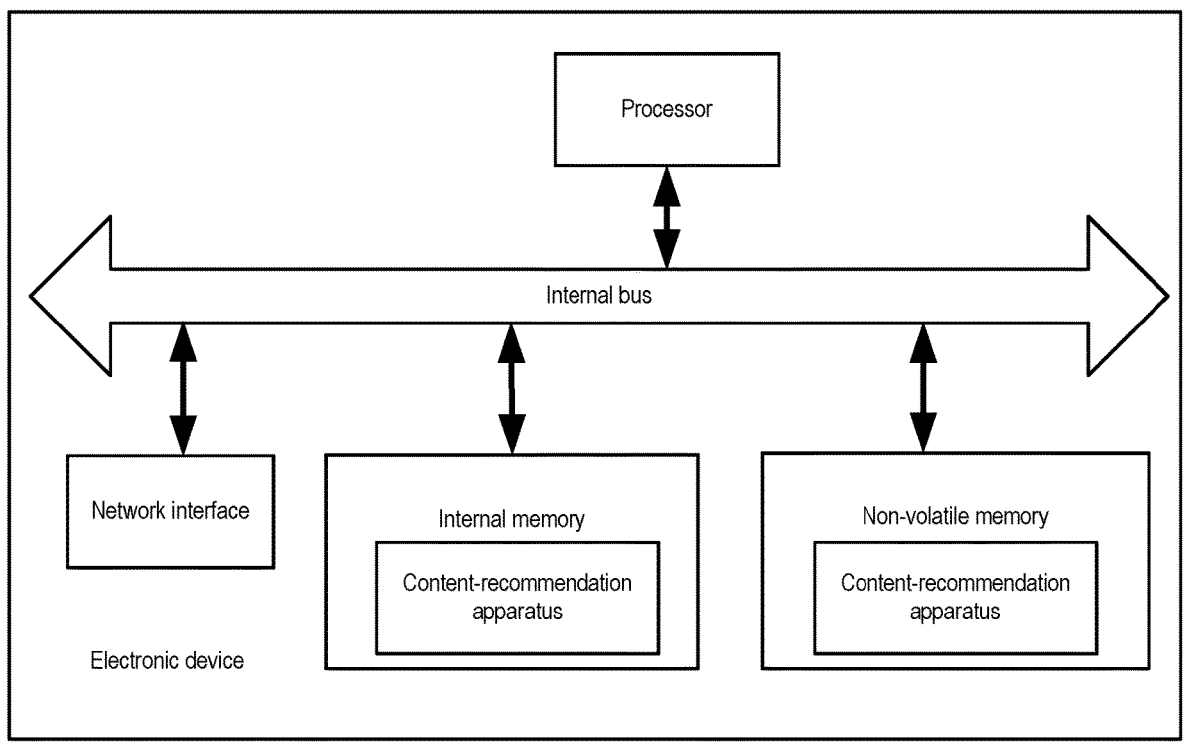
FIG. 6 is a schematic structural diagram of an electronic device, provided by one embodiment.

A server (the server may be referred to as an electronic device) of the disclosed embodiments is described below in detail with reference to FIG. 6. As shown in FIG. 6, at a hardware level, the electronic device includes a processor, and optionally the electronic device further includes an internal bus, a network interface, and a memory. The memory may include an internal memory, such as a high-speed Random-Access Memory (RAM), and may further include a non-volatile memory, such as at least one magnetic disk memory. Certainly, the electronic device may further include hardware required by other services.

The processor, the network interface, and the memory can be interconnected by the internal bus. The internal bus may be an Industry Standard Architecture (ISA) bus, a Peripheral Component Interconnection (PCI) bus, or an Extended Industry Standard Architecture (EISA) bus. The bus can be divided into an address bus, a data bus, a control bus, etc. For simplicity of illustration, only one bidirectional arrow is used as a representation in FIG. 6. However, it is not indicated that only one bus or one type of bus is present.

The memory is used to store a program. Specifically, the program may include program code including computer operation instructions. The memory can include the internal memory and the non-volatile memory, and provide instructions and data to the processor.

The processor reads a corresponding computer program from the non-volatile memory to the internal memory, runs the computer program, and forms a content-recommendation apparatus at a logical level. The processor executes the program stored in the memory and is specifically used for executing the method executed by the aforementioned server used as an execution entity.

The aforementioned methods disclosed in the embodiments shown in FIG. 2 to FIG. 5 may be applied to a processor, or may be implemented by the processor. The processor may be an integrated circuit chip and has a signal processing capability. In an implementation process, steps of the aforementioned methods can be implemented by a hardware integrated logic circuit in the processor or by instructions in the form of software. The processor can be a general-purpose processor, including a Central Processing Unit (CPU), a Network Processor (NP), etc.; or, the processor can be a Digital Signal Processor (DSP), an Application Specific Integrated Circuit (ASIC), a Field-Programmable Gate Array (FPGA), or another programmable logic device, a discrete gate or a transistor logic device, or a discrete hardware assembly. The methods, the steps, and logical block diagrams disclosed in the embodiments of the disclosure can be implemented or executed. The general-purpose processor may be a microprocessor, or the processor may be any conventional processor or the like. The operations of the methods disclosed with reference to the embodiments of the disclosure may be directly executed and completed by a hardware decoding processor, or may be executed and completed by a combination of hardware and software modules in a decoding processor. The software module may be located in a mature storage medium in the art, such as a random access memory, a flash memory, a read-only memory, a programmable read-only memory, an electrically erasable programmable memory, a register, or the like. The storage medium is located in the memory. The processor reads information in the memory, and completes the steps in the aforementioned methods in conjunction with hardware of the processor.

The electronic device can also execute the methods of FIG. 2 to FIG. 5, and implement the functions of the content-recommendation apparatus in the embodiments shown in FIG. 2 to FIG. 5, which will not be described in the embodiments of the disclosure again.

Certainly, in addition to the software implementation manner, the electronic device of the embodiments of the disclosure does not exclude other implementation manners, such as logic devices, a combination of software and hardware, etc. In other words, an execution entity of the following processing procedure is not limited to logic units, and may also be hardware or logic devices.

Embodiment 4

The disclosed embodiments further provide a computer-readable storage medium. The computer-readable storage medium stores one or more programs. When the one or more programs are executed by a server including a plurality of applications, the server is caused to execute the following operations:

search, according to a determined tag, a content database for content matching the tag; and recommend the found content to a user corresponding to the tag.

The content in the content database is determined according to first-type content acquired by an internal-operation system by means of matching and second-type content acquired by an external-operation system by means of matching.

The disclosed embodiments of the disclosure further provide a computer-readable storage medium. The computer-readable storage medium stores one or more programs. When the one or more programs are executed by a server including a plurality of applications, the server is caused to execute the following operations:

acquire second-type content by means of matching according to external operation-configuration information uploaded by a merchant; and send the second-type content to a recommendation system.

the second-type content is used to determine, together with first-type content acquired by an internal-operation system by means of matching, content in a content database of the recommendation system.

The computer-readable storage medium may be a Read-Only Memory (ROM), a Random Access Memory (RAM), a magnetic disk, an optical disc, or the like.

Embodiment 5

Figure 7A:
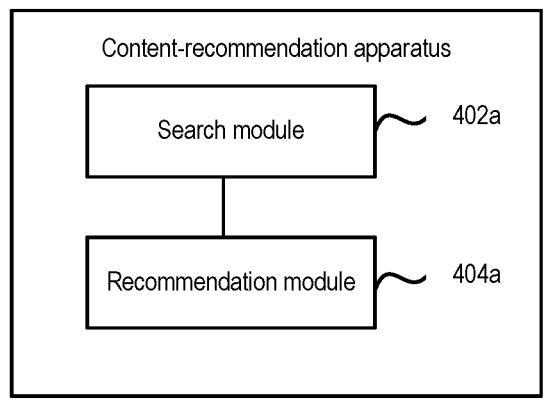
FIG. 7a is a first schematic structural diagram of a content-recommendation apparatus, provided by one embodiment.
Figure 7B:
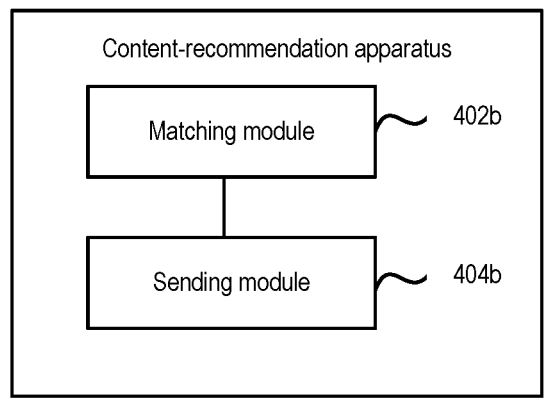
FIG. 7b is a second schematic structural diagram of a content-recommendation apparatus, provided by one embodiment.

With reference to FIG. 7a, which is a schematic structural diagram of a content-recommendation apparatus, provided by one disclosed embodiment, the apparatus mainly includes:

a search module 402a, configured to search, according to a determined tag, a content database for content matching the tag; and a recommendation module 404a configured to recommend the found content to a user corresponding to the tag.

The content in the content database is determined according to first-type content acquired by an internal-operation system by means of matching and second-type content acquired by an external-operation system by means of matching.

With reference to FIG. 6b, which is a schematic structural diagram of a content-recommendation apparatus provided by one embodiment, the apparatus mainly includes:

a matching module 402b configured to acquire second-type content by means of matching according to external operation configuration information uploaded by a merchant; and a sending module 404b configured to send the second-type content to a recommendation system.

The second-type content is used for determining, together with first-type content acquired by an internal-operation system by means of matching, content in a content database of the recommendation system.

In the disclosed embodiments, the recommendation system searches the content database for content matching a determined tag, and recommends the content to a corresponding user. In addition, the content is determined according to the first-type content acquired by the internal-operation system by means of matching and the second-type content acquired by the external-operation system by means of matching. Therefore, the external-operation system and the internal-operation system can both be configured in the content-recommendation system, thereby ensuring parallel processing of external operations and internal operations. This competition mechanism is capable of improving a conversion rate. In addition, the external-operation system and the internal-operation system can share the recommendation system, thereby ensuring the completeness of content in the recommendation system and the association of the content with external operations and internal operations. Therefore, the overall operation and maintenance efficiency of the content-recommendation system and an overall resource utilization rate are improved.

In short, the above are merely preferred embodiments of the embodiments of the disclosure, and are not intended to limit the protection scope of the disclosure. Any modifications, equivalent substitutions, and improvements made within the spirit and the principle of the embodiments of the disclosure shall fall within the protection scope of the disclosure.

The systems, apparatuses, modules, or units described in the aforementioned embodiments can be specifically implemented by a computer chip or an entity, or implemented by a product having a particular function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of any of the devices.

The computer-readable medium includes non-volatile, volatile, removable, and fixed media that may implement information storage by using any method or technology. Information may be a computer-readable instruction, a data structure, a program module, or other data. Examples of computer storage media include but are not limited to a phase change memory (PRAM), a Static Random Access Memory (SRAM), a Dynamic Random Access Memory (DRAM), other type of Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette magnetic tape, and tape and disk storage or other magnetic storage device or any other non-transmission media that may be configured to store information that a computing device can access. As defined herein, the computer-readable medium does not include transitory computer-readable media (transitory media), such as a modulated data signal and a carrier.

It should be further noted that the terms "including," "comprising," or any other variants of the terms are intended to encompass a non-exclusive inclusion, causing a process, method, commodity, or device including a series of elements to not only include these elements, but also include other elements that are not clearly listed, or further include elements that are inherent to the process, method, commodity, or device. Without further restriction, elements defined by the statement "including one . . . " do not exclude that a process, method, commodity, or device including the elements further includes additional identical elements.

All of the embodiments of the disclosure are described in a progressive manner; for the same or similar parts in the embodiments, reference may be made to each other, and each embodiment focuses on a difference between the embodiment and other embodiments. Especially, the system embodiments are basically similar to the method embodiments, and therefore are described briefly; for related parts, reference may be made to corresponding descriptions in the method embodiments.

What is claimed is:

1. A content-recommendation method, comprising:
deploying a distributed system, the distributed system including an internal-operation system residing on a first computing system and an external-operation system residing on a second different computing system, and a recommendation system communicatively coupled to both the internal-operation system and the external-operation system, the recommendation system including a content database;
determining, by the internal-operation system, a first type of content by matching corresponding tags, wherein a respective piece of content of the first type indicates user traffic associated with a corresponding piece of merchandise in the distributed system, and wherein a matching tag indicates recommendation for the piece of merchandise;
determining, by the external-operation system, a second type of content by matching the corresponding tags, wherein a respective piece of content of the second type indicates promotional information directed to a piece of merchandise;
performing, in parallel, actions including:
acquiring, by the internal-operation system of the distributed system, the first type of content by matching internal information uploaded by an operation platform, and sending the first type of content to the recommendation system;
acquiring, by the internal-operation system of the distributed system, traffic access amount to individual types of content by matching traffic-distribution policy uploaded by the operation platform, and sending the traffic access amount to the recommendation system;
acquiring, by the external-operation system of the distributed system, the second type of content by matching external information uploaded by a merchant, and sending the second type of content to the recommendation system;
acquiring, by the internal-operation system of the distributed system, a content-recommendation policy by matching internal information uploaded by the operation platform, and sending the content-recommendation policy to the recommendation system; and
processing, by the recommendation system, the first type of content and the second type of content according to the content recommendation policy by at least merging the first and second types of content a merged piece of content;
searching, by the recommendation system based on a tag, a content in the content database for a piece of merchandise information matching the tag according to the content-recommendation policy;
recommending, based on resource provisioning using at least the traffic access amount by the recommendation system, the matching piece of merchandise information to a user corresponding to the tag through electronic communication between the distribution system and a user device of the user; and
separately configuring one or more of the internal-operation system or the external-operation system based on a behavior of the user after the matching piece of merchandise information has been recommended to the user through the electronic communication.

2. The method of claim 1, wherein the content-recommendation policy comprises a merging sub-policy; and
wherein the merging the first and second types of content comprises:
merging, by the recommendation system, the first type of content with the second type of content according to the merge sub-policy to generate the merged piece of content.

3. The method of claim 2, wherein the content-recommendation policy comprises a sorting sub-policy; and
wherein the method further comprises: sorting, by the recommendation system according to the sorting sub-policy, the merged piece of content stored in the content database to generate a sorting order.

4. The method of claim 3, wherein recommending the matching piece of merchandise information to the user further comprises:
sequentially recommending, by the recommendation system according to the sorting order, the matching piece of merchandise information to the user corresponding to the tag.

5. The method of claim 1, wherein the content-recommendation policy comprises a sorting sub-policy; and
wherein the method further comprises:
sorting, by the recommendation system, the first type of content and the second type of content according to the sorting sub-policy.

6. The method of claim 1, wherein acquiring the second type of content further comprises:
receiving, by the external-operation system, a first piece of external information uploaded by at least one merchant;
statistically integrating, by the external-operation system, the first piece of external information to obtain merchant-shared information; and
acquiring, by the external-operation system, the second type of content by matching the merchant-shared information.

7. The method of claim 1, wherein acquiring the second type of content further comprises:
receiving, by the external-operation system, a second piece of external information uploaded by at least one merchant;
acquiring, by the external-operation system, a piece of sub-content by matching the second piece of external information; and
integrating, by the external-operation system, the piece of sub-content to obtain the second type of content.

8. The method of claim 1, wherein after recommending, by the recommendation system, the matching piece of merchandise information to the user, the method further comprises:
monitoring, by the recommendation system, an access status of the user with respect to the recommended piece of merchandise; and
feeding, by the recommendation system, the access status back to the internal-operation system and the external-operation system.

9. A content-recommendation apparatus in a distributed system, the distributed system including an internal-operation system residing on a first computing system and an external-operation system residing on a second different computing system, wherein the content-recommendation apparatus communicatively coupled to both the internal-operation system and the external-operation system, the content-recommendation apparatus comprising:
recommendation circuitry;
matching circuitry configured to:
determine a first type of content by matching corresponding tags, wherein a respective piece of content of the first type indicates user traffic associated with a corresponding piece of merchandise in the distributed system, and wherein a matching tag indicates recommendation for the piece of merchandise; and
determine a second type of content by matching the corresponding tags, wherein a respective piece of content of the second type indicates promotional information directed to a piece of merchandise;
perform, in parallel, actions including:
acquiring, from the internal-operation system of the distributed system, the first type of content by matching internal information uploaded by an operation platform, and sending the first type of content to the recommendation circuitry;
acquiring, from the internal-operation system of the distributed system, traffic access amount to individual types of content by matching traffic-distribution policy uploaded by the operation platform, and sending the traffic access amount to the recommendation circuitry;
acquiring, from the external-operation system of the distributed system, the second type of content by matching external information uploaded by a merchant, and sending the second type of content to the recommendation circuitry; and
acquiring, by the internal-operation system of the distributed system, a content-recommendation policy by matching internal information uploaded by the operation platform, and sending the content-recommendation policy to the recommendation circuitry; and
processing, by the recommendation system, the first type of content and the second type of content according to the content recommendation policy by at least merging the first and second types of content a merged piece of content;
a storage device configured to store the first and second types of content in a content database of the distributed system;
merging circuitry configured to merge the first and second types of content based on respective weight ratios of the first and second types of content to generate a merged piece of content to be stored in the content database, a weight ratio of the first type of content being different from a weight ratio of the second type of content;
search circuitry configured to search, based on a tag, a content in the content database for a piece of merchandise information matching the tag; and
wherein the recommendation circuitry is configured to recommend, based on resource provisioning using at least the traffic access amount, the matching piece of merchandise information to a user corresponding to the tag through electronic communication between the distribution system and a user device of the user, and is configured to cause one or more of the internal-operation system or the external-operation system be separately configured based on a behavior of the user after the matching piece of merchandise information has been recommended to the user through the electronic communication.

10. A content-recommendation system, comprising:
a processor;
a memory coupled to the processor and storing instructions, which when executed by the processor cause the processor to perform a content-recommendation method, the method comprising:
deploying a distributed system, the distributed system including an internal-operation system residing on a first computing system and an external-operation system residing on a second different computing system, and a recommendation system communicatively coupled to both the internal-operation system and the external-operation system, the recommendation system including a content database;
determining, by the internal-operation system, a first type of content by matching corresponding tags, wherein a respective piece of content of the first type indicates user traffic associated with a corresponding piece of merchandise in the distributed system, and wherein a matching tag indicates recommendation for the piece of merchandise;
determining, by the external-operation system, a second type of content by matching the corresponding tags, wherein a respective piece of content of the second type indicates promotional information directed to a piece of merchandise;
performing, in parallel, actions including:
acquiring, by the internal-operation system of the distributed system, the first type of content by matching internal information uploaded by an operation platform, and sending the first type of content to the recommendation system;
acquiring, by the internal-operation system of the distributed system, traffic access amount to individual types of content by matching traffic-distribution policy uploaded by the operation platform, and sending the traffic access amount to the recommendation system;
acquiring, by the external-operation system of the distributed system, the second type of content by matching external information uploaded by a merchant, and sending the second type of content to the recommendation system;
acquiring, by the internal-operation system of the distributed system, a content-recommendation policy by matching internal information uploaded by the operation platform, and sending the content-recommendation policy to the recommendation system; and
processing, by the recommendation system, the first type of content and the second type of content according to the content recommendation policy by at least merging the first and second types of content a merged piece of content;
searching, by the recommendation system based on a tag, a content in the content database for a piece of merchandise information matching the tag according to the content-recommendation policy;
recommending, based on resource provisioning using at least the traffic access amount, the matching piece of merchandise information to a user corresponding to the tag through electronic communication between the distribution system and a user device of the user; and
separately configuring one or more of the internal-operation system or the external-operation system based on a behavior of the user after the matching piece of merchandise information has been recommended to the user through the electronic communication.

11. The content-recommendation system of claim 10, wherein the content-recommendation policy comprises a merging sub-policy; and
wherein the merging the first and second types of content comprises:
merging, by the recommendation system, the first type of content with the second type of content according to the merge sub-policy to generate the merged piece of content.

12. The content-recommendation system of claim 11, wherein the content-recommendation policy comprises a sorting sub-policy; and
wherein the method further comprises: sorting, by the recommendation system according to the sorting sub-policy, the merged piece of content stored in the content database to generate a sorting order.

13. The content-recommendation system of claim 12, wherein recommending the matching piece of merchandise information to the user further comprises:
sequentially recommending, by the recommendation system according to the sorting order, the matching piece of merchandise information to the user corresponding to the tag.

14. The content-recommendation system of claim 10, wherein the content-recommendation policy comprises a sorting sub-policy; and
wherein the method further comprises:
sorting, by the recommendation system, the first type of content and the second type of content according to the sorting sub-policy.

15. The content-recommendation system of claim 10, wherein acquiring the second type of content further comprises: receiving, by the external-operation system, a first piece of external
information uploaded by at least one merchant;
statistically integrating, by the external-operation system, the first piece of external information to obtain merchant-shared information; and
acquiring, by the external-operation system, the second type of content by matching the merchant-shared information.

16. The content-recommendation system of claim 10, wherein acquiring the second type of content further comprises: receiving, by the external-operation system, a second piece of external
information uploaded by at least one merchant;
acquiring, by the external-operation system, a piece of sub-content by matching the second piece of external information; and
integrating, by the external-operation system, the piece of sub-content to obtain the second type of content.

\* \* \* \* \*

UNITED STATES PATENT AND TRADEMARK OFFICE
CERTIFICATE OF CORRECTION

PATENT NO. : 12,159,305 B2  
APPLICATION NO. : 16/959643  
DATED : December 3, 2024  
INVENTOR(S) : Zhichao Zhou et al.

Page 1 of 1

It is certified that error appears in the above-identified patent and that said Letters Patent is hereby corrected as shown below:

In the Claims

Column 17, Claim 9, Line 26:
"circuitry:" should read: --circuitry;--.

Signed and Sealed this
Eighteenth Day of February, 2025

Coke Morgan Stewart
*Acting Director of the United States Patent and Trademark Office*